US010591586B2

(12) United States Patent
Trotta et al.

(10) Patent No.: US 10,591,586 B2
(45) Date of Patent: Mar. 17, 2020

(54) SYSTEM AND METHOD FOR IDENTIFYING A TARGET USING RADAR SENSORS

(71) Applicant: Infineon Technologies AG, Neubiberg (DE)

(72) Inventors: Saverio Trotta, Munich (DE); Ashutosh Baheti, Munich (DE); Reinhard-Wolfgang Jungmaier, Aying (DE); Avik Santra, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 249 days.

(21) Appl. No.: 15/703,605

(22) Filed: Sep. 13, 2017

(65) Prior Publication Data

US 2019/0011534 A1  Jan. 10, 2019

Related U.S. Application Data

(60) Provisional application No. 62/529,967, filed on Jul. 7, 2017.

(51) Int. Cl.
*G01S 7/41* (2006.01)
*G01S 13/86* (2006.01)
*G01S 13/87* (2006.01)
*G01S 13/89* (2006.01)
*G06F 21/32* (2013.01)
*G07C 9/00* (2006.01)

(52) U.S. Cl.
CPC .............. *G01S 7/412* (2013.01); *G01S 7/417* (2013.01); *G01S 13/867* (2013.01); *G01S 13/878* (2013.01); *G01S 13/89* (2013.01); *G06F 21/32* (2013.01); *G07C 9/00158* (2013.01)

(58) Field of Classification Search
CPC ........ G01S 7/412; G01S 13/878; G01S 13/89; G01S 7/417; G01S 13/867; G06F 21/32; G07C 9/00158
USPC ........................................................ 342/52
See application file for complete search history.

(56) References Cited

U.S. PATENT DOCUMENTS 4,901,084 A * 2/1990 Huguenin ............... G01S 7/024
250/332
6,987,560 B2 * 1/2006 Morgan ................ G01S 7/4802
356/4.09

(Continued)

FOREIGN PATENT DOCUMENTS

| CN | 103707781 A | 4/2014 |
| WO | 2008102291 A2 | 8/2008 |
| WO | 2012038867 A1 | 3/2012 |

OTHER PUBLICATIONS

Diederichs, Kailtyn et al., "Wireless Biometric Individual Identification Utilizing Millimeter Waves", IEEE Sensors Letters, vol. 1, No. 1, Feb. 2017, 4 pages.

*Primary Examiner* — Frank J McGue
(74) *Attorney, Agent, or Firm* — Slater Matsil, LLP

(57) ABSTRACT

In accordance with an embodiment, a method of recognizing a biological target includes performing radar measurements for a plurality of sites on the biological target using a millimeter-wave radar sensor, producing a target data set for the plurality of sites based on the radar measurements, extracting features from the target data set, comparing the extracted features to stored features, and determining whether the extracted features match the stored features based on the comparing.

22 Claims, 12 Drawing Sheets

(56) References Cited

U.S. PATENT DOCUMENTS

| | | | |
|---|---|---|---|
| 9,202,105 B1 | 12/2015 | Wang et al. | |
| 9,524,421 B2 | 12/2016 | Ross et al. | |
| 2004/0133804 A1* | 7/2004 | Smith | G06Q 10/10 |
| | | | 713/186 |
| 2007/0030115 A1 | 2/2007 | Itsuji et al. | |
| 2007/0237365 A1 | 10/2007 | Monro | |
| 2008/0101705 A1* | 5/2008 | Mohamed | G06K 9/00885 |
| | | | 382/224 |
| 2010/0002912 A1* | 1/2010 | Solinsky | G06K 9/00248 |
| | | | 382/117 |
| 2011/0134240 A1* | 6/2011 | Anderson | G06K 9/00771 |
| | | | 348/143 |
| 2017/0124384 A1* | 5/2017 | Allyn | G06K 9/2018 |

* cited by examiner

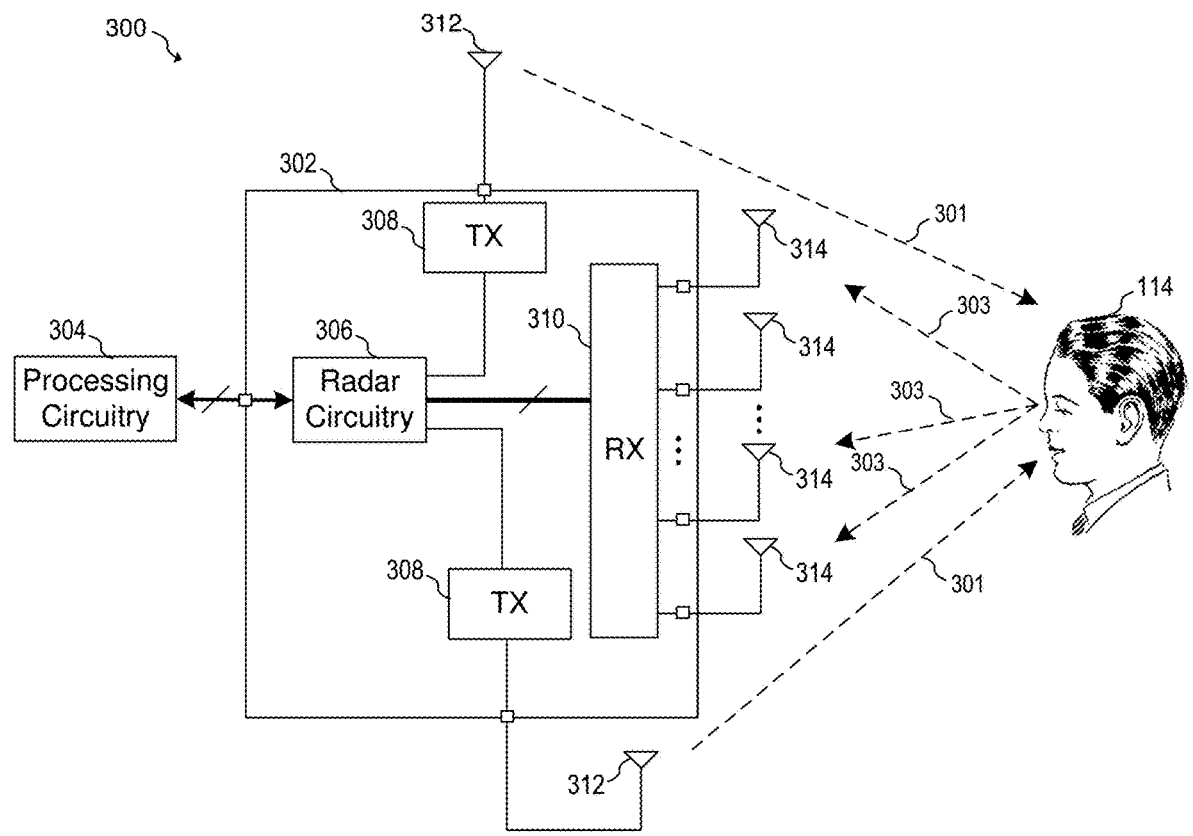
Fig. 3A
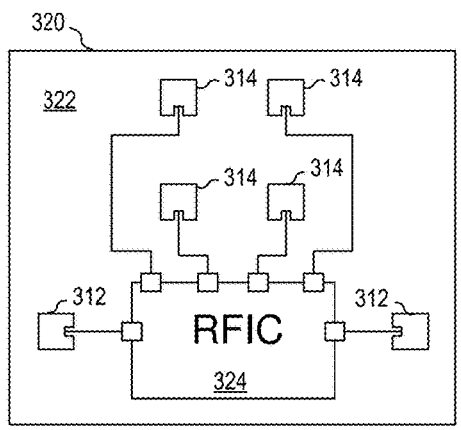 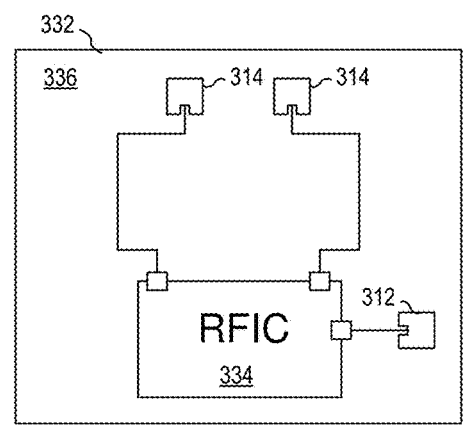
Fig. 3B        Fig. 3C

SYSTEM AND METHOD FOR IDENTIFYING A TARGET USING RADAR SENSORS

This application claims the benefit of U.S. Provisional Application No. 62/529,967, filed on Jul. 7, 2017, which application is hereby incorporated herein by reference in its entirety.

TECHNICAL FIELD

The present invention relates generally to electronic systems, and, in particular embodiments, to a system and method for identifying a target using radar sensors.

BACKGROUND

Applications in the millimeter-wave frequency regime have gained significant interest in the past few years due to the rapid advancement in low cost semiconductor technologies such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal, and determining a distance based on a time delay and/or frequency difference between the transmission and reception of the frequency modulated signal. Accordingly, some radar systems include a transmit antenna to transmit the RF signal, a receive antenna to receive the RF, as well as the associated RF circuitry used to generate the transmitted signal and to receive the RF signal. In some cases, multiple antennas may be used to implement directional beams using phased array techniques. A MIMO configuration with multiple chipsets can be used to perform coherent and non-coherent signal processing, as well.

SUMMARY

In accordance with an embodiment, a method of recognizing a biological target includes performing radar measurements for a plurality of sites on the biological target using a millimeter-wave radar sensor, producing a target data set for the plurality of sites based on the radar measurements, extracting features from the target data set, comparing the extracted features to stored features, and determining whether the extracted features match the stored features based on the comparing.

BRIEF DESCRIPTION OF THE DRAWINGS

For a more complete understanding of the present invention, and the advantages thereof, reference is now made to the following descriptions taken in conjunction with the accompanying drawings, in which:

FIG. 3A illustrates a block diagram of an embodiment millimeter-wave radar sensor, and FIGS. 3B and 3C illustrate plan views of embodiment millimeter-wave radar sensor circuits;

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for performing facial recognition using a radar system. The invention may also be applied to other RF-based systems and applications that perform feature recognition.

In embodiments of the present invention multiple millimeter-wave based sensors are used to perform feature recognition functions, such as facial recognition. One of the issues that affects convention optically-based facial recognition systems its vulnerability to be spoofed by presenting a photographic image of the person to be authenticated. In embodiments of the present invention, facial recognition is performed using an array of millimeter-wave-based radar sensors that perform measurements on a plurality of points of the users face. By measuring parameters such as the depth of facial features and the distance between facial features, as well as the reflective properties of portions of the users face as they relate to high-frequency RF signals, an effective identification and authentication of a person may be achieved. In some embodiments, a machine learning algorithm is used to classify and optimize RF measurements made of a person's face for effective comparison to later measurements. During the machine learning process, parameters of an image formation algorithm that produces feature vectors of the user are iteratively modified in order to increase identification accuracy. It should be understood that systems directed toward human facial recognition can also be used to identify other portions of the human body as well as non-human targets. These other targets could include living or non-living biological targets such as plants and animals or non-biological targets in which the physical dimensions and RF reflective properties of the targets provide an opportunity for identification based on these properties.

Figure 1A:
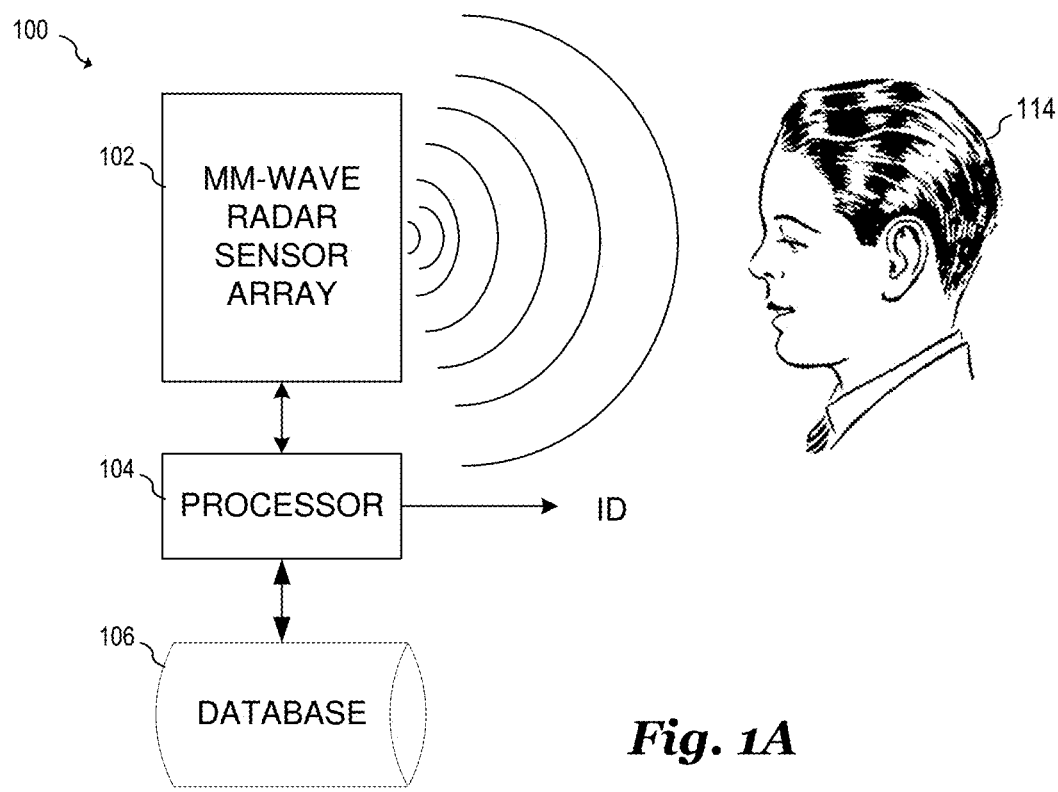
FIG. 1A illustrates a millimeter-wave radar-based facial recognition system.

FIG. 1A illustrates a block diagram of radar-based facial recognition system boo. As shown, radar-based facial recognition system 100 includes a millimeter-wave radar sensor array 102, a processor 104 and a database 106 that contains feature vectors based on RF measurements of users that may be identified by the system. During operation, millimeter-wave radar sensor array 102 transmits millimeter-wave RF signals that are reflected by a target 114. The reflected millimeter-wave RF signals are received by millimeter-wave radar sensor array 102. These received RF signals are converted to a digital representation, processed by processor 104, and compared to user measurements contained in database 106. The result of this comparison produces an indication ID representing the identity of target 114. While target 114 is represented in the illustration as a person whose identity is being authenticated based on facial features, it should be understood that in alternative embodiments of the present invention, other features and other objects may be measured and authenticated. For example, embodiment systems may authenticate a persons' identity based on other parts of the body such as the palm of the hand. In further embodiments, the identity of nonhuman objects, biological, non-biological, organic and inorganic may be identified and authenticated using embodiment systems.

In some embodiments, target 114 is exposed to a plurality of radar beams in a near field sensing zone, which may be, for example, a distance of less than 10 cm from millimeter wave radar sensor array 102. Alternatively, target 114 is placed in a mid-sensing zone between about 10 cm and about 30 cm from radar sensor array 102. With near-field sensing parameters such as minute skin texture and scaling can be extracted, identified and distinguished. In some embodiments, near field sensing could also be applied to other forms of biometric recognition, such as recognition of a user based on the user's hand or fingers. Mid-sensing may be used to extract various macro facial features including, but not limited to the shape and/or size of different body parts, and depth and size of facial features.

Figure 1B:
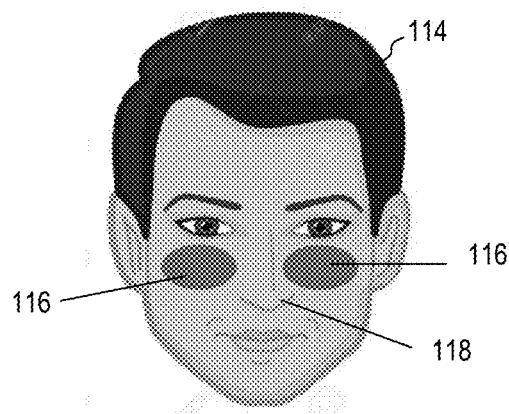
FIG. 1B illustrates a points on a user face that are evaluated by an embodiment facial recognition system.

The radar beams produces by radar sensor array 102 may be directed at various points of the user's face as shown with respect to target 114 shown in FIG. 1B. In some embodiments, one or more radar beams are directed toward biometric feature extraction sites 116 on the users face. In the illustrated diagram biometric feature extraction sites 116 are shown as the right and left cheek of the user, however, other parts of the face may be used instead of or in addition to the user's cheeks. The RF properties of radar signals that are reflected from biometric feature extraction sites 116 may be stored and parameterized in a manner that allows comparison to pre-stored measurements. In addition to biometric feature extraction points, a reference point such as center extracted point 118 may be used to feature depths of user's space and/or may be used for system alignment purposes. As shown in FIG. 1B, center extracted point 118 is the tip of the nose of the user, however, in alternative embodiments, other facial features may be used for either a center extracted point or other reference points. By measuring the various feature depths of the face of user represented by target 114 and the RF reflective properties of the measured biometric feature extraction sites 116, the identification of target 114 may be securely identified. Because the measured properties of the face of target 114 differ from that of a photograph or other visual image, or even a three-dimensional representation of the user's face such as a mask, the use of millimeter-wave-based radar sensors in the facial identification process prevents spoofing using models and representations of the user's face. In addition, embodiment millimeter-wave radar-based facial recognition systems may be provide a higher degree of accuracy at lower cost in comparison with other biometric sensor types, including optical sensors, fingerprint scanners, retinal scanners and the like.

Figure 1C:
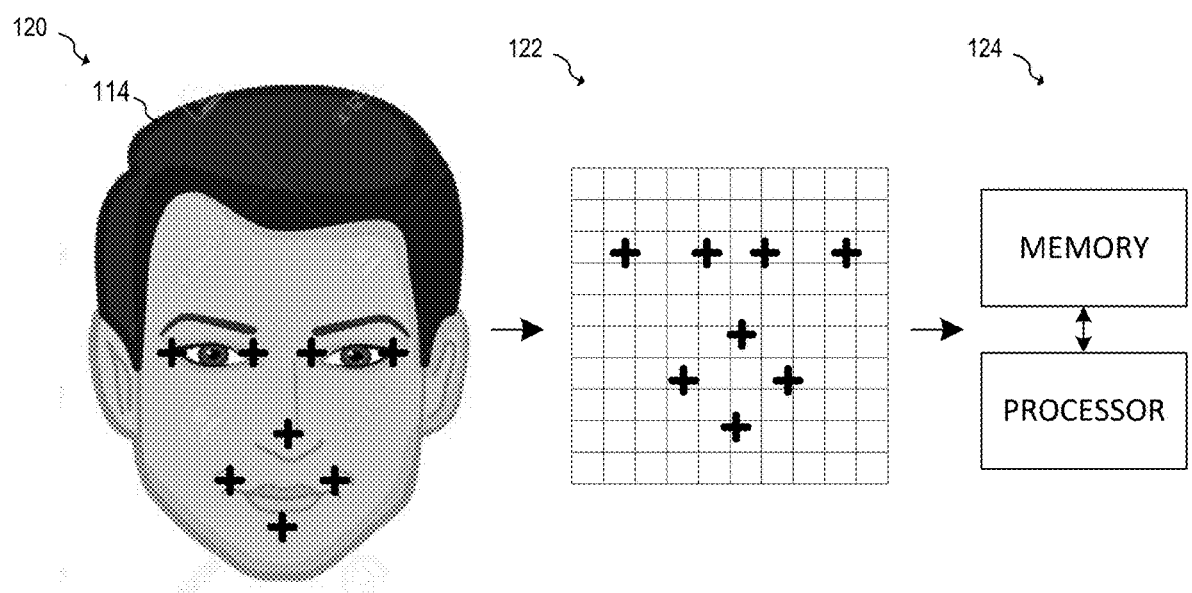
FIG. 1C illustrates a pictogram representing an embodiment facial feature storage process.

FIG. 1C illustrates a pictogram that represents an embodiment facial feature storage process. In step 120, an embodiment radar sensor system performs a series of measurements on the face of target 114 that are denoted by the "+" symbol. Each one of these measurements can be referred to as a radar pixel. As shown, these measurements are made on the left and right side of each eye, the tip of the user's nose, and the right, left, and center of the user's lips. It should be understood that these points are merely examples and other portions of the users face may be measured instead of or in addition to the points shown in FIG. 1C. In various embodiments facial features may be selected that have a variety of depths and a variety of reflective properties with respect to a millimeter-wave radar signal. For example, the reflective properties of the user's nose may be different from the reflective properties of the user's lips because of differences in skin depth and tissue type in these regions of the face. In some embodiments, by incorporating a variety of different facial features, the ability of the system to reliably identify and authenticate a user may be enhanced. Next, in step 122, the embodiment system stores measurements at each point of the user's face into a database as an algorithm of numbers. In some embodiments, raw radar measurements are transformed into sets of feature vectors using a variety of digital signal processing algorithms and machine learning algorithms that are discussed herein below. In step 124, these feature vectors are stored in a computer memory for later comparison and authentication.

Figure 1D:
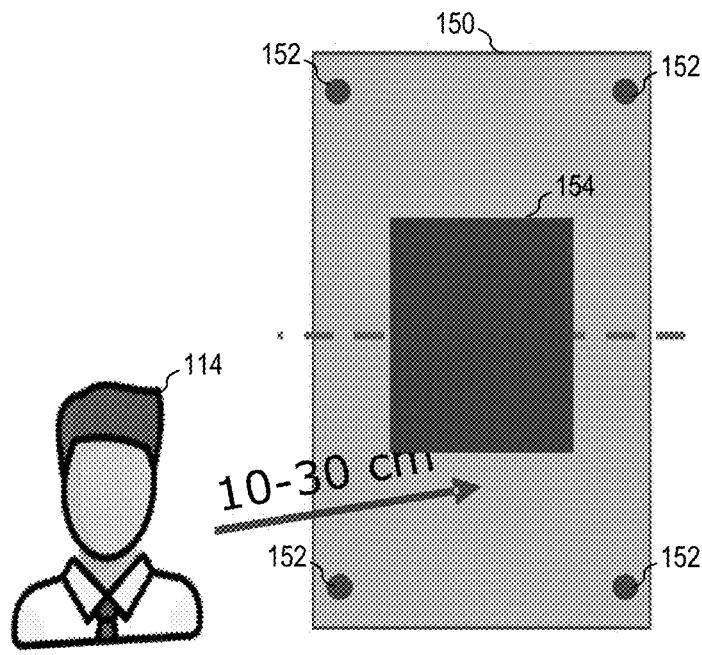
FIG. 1D illustrates an embodiment device panel with alignment LEDs.

In some embodiments, the user represented by target 114 interacts with an embodiment facial recognition system via a device panel 150 that includes radar sensor circuits 154 and a plurality of face alignment light emitters 152 as shown in FIG. 1D. During the facial recognition process, the user aligns his or her face with device panel 150 using light emitters 152 as a visual guide or cue. For example, the user may align his or her face within the boundaries of light emitters 152, while keeping the distance between the user's face and device panel 150 within a predefined range of distances. In some embodiments, this predefined range of distances places target 114 within the mid-sensing zone of radar sensor circuits 154. In some embodiments, this predefined range may be between about 10 cm and about 30 cm. Distances of less than about 10 cm may be within the near field sensing zone of radar sensor circuits 154, while the ability of the system to extract accurate distance information decreases at distances of greater than about 30 cm. It should be understood that these ranges are just examples; the actual predefined range may vary according to the particular system architecture and the specifications of the particular system. In some embodiments, this predefined range may be optimized for better performance. Also, some embodiments may utilize the near field zone of less than about 10 cm instead of or in addition to the mid-sensing zone of radar circuits 154.

In some embodiments, the facial recognition system is configured to initiate radar measurements of the face of target 114 once the system senses that target 114 is within the boundary of light emitters 152, and within the predetermined range of radar sensor circuits 154. This determination of the position of target 114 may be determined using radar sensor circuits 154, a video camera monitoring target 114 or a combination thereof. In various embodiments, light emitters 152 may be implemented using light emitting diodes (LEDs). In alternative embodiments of the invention, other devices besides LEDs may be used to provide target 114 with the visual cue for alignment. These other devices may include, for example, lighting devices such as incandescent lamps or lasers, or other objects that can provide a visual cue. It should also be understood that greater or fewer than four light emitters 152 may be used in alternative embodiments.

Figure 1E:
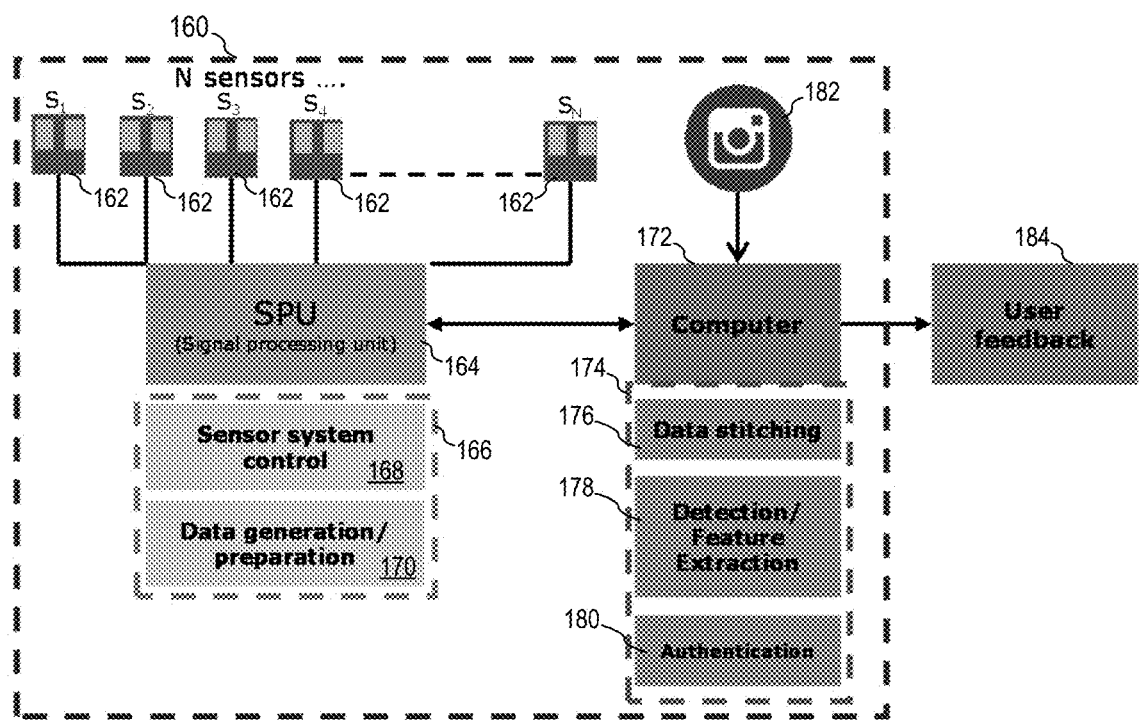
FIG. 1E illustrates a block diagram of an embodiment facial recognition system.

FIG. 1E illustrates a block diagram of facial recognition system 160. As shown, facial recognition system 160 includes a plurality of millimeter-wave radar sensors 162 coupled to signal processing unit (SPU) 164. Millimeter-wave radar sensors 162 include the requisite RF circuitry and antennas to perform a radar measurement and convert the performed radar measurement from the analog domain to the digital domain, and are coupled to SPU 164 using a digital bus as described above. SPU 164 provides the digitized output of millimeter-wave radar sensors 162 to computer 172. Embodiment functionality 166 provided by SPU 164 includes sensor system control 168, and data generation in preparation 170. Sensor control 168 provides measurement and control parameters to millimeter wave radar sensors 162. Measurement parameters may include, for example, beam steering parameters and sweep frequency parameters as well as various other initialization parameters for millimeter-wave radar sensors 162. Control signals may include, for example, commands to initiate radar measurements and commands to control the exchange of data between SPU 164 and millimeter-wave radar sensors 162. Data generation and preparation functionality 170 may be configured to manage, format, and/or transform raw data produced by millimeter-wave radar sensors 162. Prior to being transferred to computer 172. Sensor system control functionality 168 and data generation and preparation functionality 170 may be implemented using software that is executed by SPU 164. Alternatively, sensor system control 168 and/or data generation preparation 170 may be implemented using hardware logic, programmable logic or dedicated circuitry resident on SPU 164.

In various embodiments, radar sensors 162 can be used to implement radar pixels that are directed toward various portions of a target, such as specific portions of a user's face such as shown in FIG. 1C. For example, one of radars sensors 162 can correspond to a first radar pixel directed toward portion of the users face adjacent to the left eye, a second one of radar sensors 162 can be directed toward a portion of the user's face adjacent to the right eye, a third one of radar sensors 162 can be directed toward a user's nose, and a remaining plurality of radar sensors 162 can be directed toward various portions of the user's lips. In various embodiments, these radar pixels may be implemented using separate millimeter-wave radar sensor circuits 162 that are each directed to different portions of the user's face. Alternatively, a smaller number of radar sensor circuits may be used in a time multiplexed fashion. For example, a single millimeter-wave radar circuit 162 may be used to perform radar measurements on various portions of the users face by scanning the user's face using beam steering.

Once the millimeter-wave radar circuits 162 perform measurements corresponding to various radar pixels, data associated with these pixels are sent to signal processing unit (SPU) 164. Communication with SPU 164 may occur over of variety of digital communication channels implemented according to various digital bus standards, such as SPI, USB, BT, WiFi, WigiG, I3C, LVDS and MIPI. Alternatively, other bus types and standards may be used. SPU 164 provides a status definition of the various radar pixels. A comparison with preloaded information, such as feature data representing authorized users, is performed, for example, by computer 172. The functionality of computer 172 may be implemented local to the radar sensor or may be implemented fully or in part by another processing device, such as a computer server or cloud-based processor. Once the comparison with the preloaded information has been performed, if the measured facial recognition features matches an authorized user is represented within the preloaded information, a defined action may be performed. This defined action may include, for example, an identification of the user, as well as physical action such as unlocking a door or providing access to a computer or other system.

Computer 172 is configured to receive raw and/or radar sensor data from SPU 164. In some embodiments of the present invention, computer 172 processes the data provided by SPU 164 to match facial features represented by millimeter-wave radar sensor data to store data representing various users. Computer 172 may also be configured to produce reference user data sets for comparison to future measurements for the purpose of identity authentication. In an embodiment, computer 172 implements functionality 174. Functionality 174 may include, for example, data stitching 176 detection and feature extraction 178 and authentication 180. Data stitching functionality 176 includes formatting and synchronizing the received output of millimeter-waves 162 for further processing by detection and feature extraction functionality 178.

In an embodiment, detection and feature extraction functionality 178 takes the data that has been processed by data stitching functionality 176 and produces a set of feature vectors that corresponds to facial features measured by millimeter-wave sensors 162. These detection and feature extraction operations 178 may include, for example, a variety of signal processing steps, such as FFT's and other numerical operations, as well as the execution of machine learning and classification algorithms. When producing a stored data set for a new user, detection and feature extraction functionality 178 may use the machine learning algorithm to provide a set of reference feature vectors that provide an effective identification of target 114. The execution of the machine learning algorithm may also optimize parameters used in the feature extraction process. In some embodiments, the machine learning algorithm may also be used to set sensor system control parameters of millimeter-wave sensors 162, which may be fed back to SPU 164 during operation. When processing a measurement of the target 114 for authentication purposes, detection and feature extraction functionality 178 may provide a set of feature vectors based on the measurements provided by SPU 164.

Authentication functionality 180 may use a prediction model to determine when the measurements provided by millimeter-wave sensors 162 are associated with stored feature vectors associated with a known user. The result of this authentication process may be provided to the user via user feedback 184. This user feedback 184 may include, for example, visual or audio indication, or may be used to perform another action such as unlocking a door or providing access to the computer system. Functionality 174 that includes data stitching 176, detection and feature extraction 178 and authentication 180 may be implemented as software executed by computer 172.

Camera 182 may be used to assist sensor system 160 with aligning target 114 to millimeter-wave sensors 162. For example, camera 182 may capture and image of the user and display the image with a superimposed boundary, such as a box. Once the system detects that the user's face is within the superimposed boundary (either automatically or via user feedback), the facial recognition process is initiated. In some embodiments, the image of target 114 captured by camera 182 may be used to help authenticate user represented by target 114. In other embodiments, four radar sensors situated at the corners of a sensing array can be used to help the user calibrate/align the user's face with the sensor array.

Figure 2C:
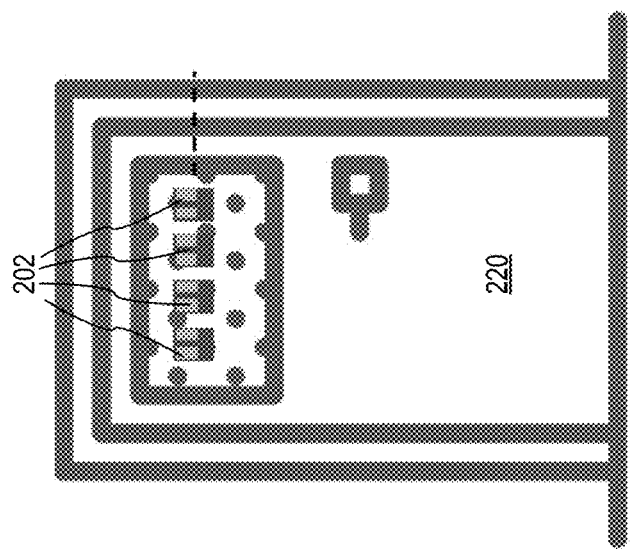
FIGS. 2A, 2B and 2C illustrate various implementation scenarios of embodiment facial recognition systems.
Figure 2B:
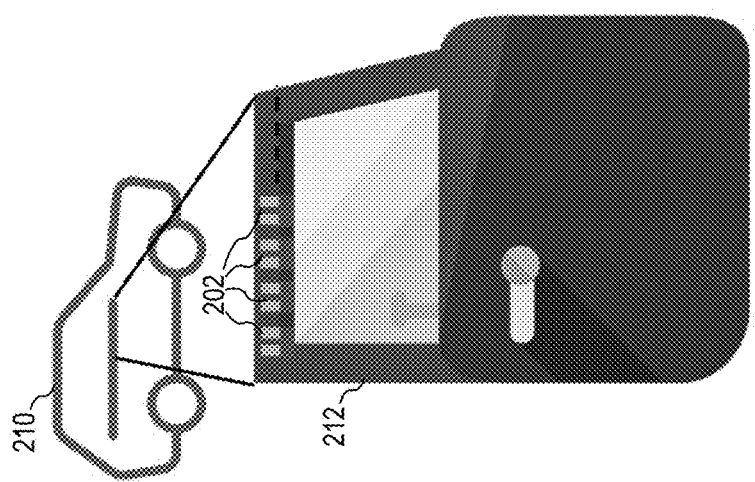
Figure 2A:
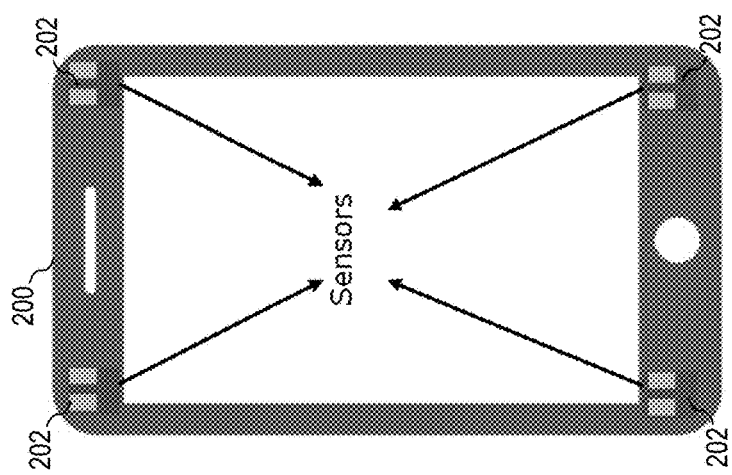

FIGS. 2A through 2C illustrate how embodiment millimeter-wave based facial recognition systems used in conjunction with various applications. FIG. 2A illustrates smart phone 200 on which millimeter-wave radar sensors 202 are mounted. As shown, smart phone 200 includes for millimeter-wave radar sensors 202, one in each corner of smart phone 200. During operation, millimeter-wave radar sensors 202 measure a plurality of points on the user's face and determines whether or not the measurements of the users face correspond with a stored set of measurements. This determination may be made locally on smart phone 200 or via a remote computer, such as a cloud computer in communication with smart phone 200. The authentication provided by smart phone 200 may be used, for example, to access smart phone 200, to access certain features within smart phone 200, or may be used as a way for computer systems in communication with smart phone 200 to authenticate the user. For example, an application running on smart phone 200 may use the embodiment millimeter-wave based facial recognition system to authenticate the user or provide certain functionality within the application. For example, if the application is a banking application, the embodiment millimeter-wave based facial recognition system may be used to verify the identity of the user and provide access to the user's bank account based on the authenticated facial recognition measurements.

FIG. 2B illustrates an automobile 210 on which a plurality of millimeter-wave radar sensors 202 is mounted on door 212 of automobile 210. During operation, an embodiment facial recognition system utilizing millimeter-wave radar sensors 202 may recognize the user as the user approaches door 212. When the facial recognition system authenticates the user via millimeter-wave measurements, the door may be unlocked. In some embodiments, the facial recognition system may also be used to allow the user to operate the car. Another set of embodiment millimeter-wave based facial recognition system may also be mounted within automobile 210 to allow the user to be identified within the car.

FIG. 2C illustrates a door 220 on which millimeter-wave radar sensors 202 are mounted. An embodiment millimeter-wave based facial recognition system may be used to authenticate the user as the user approaches door 220. When the system authenticates the user, the door 220 is unlocked.

It should be understood that the application examples shown in FIGS. 2A, 2B and 2C are just a few examples of many possible applications that can be used in conjunction with embodiment millimeter-wave based facial recognition systems. While only four millimeter-wave radar sensors 202 are shown mounted on the object shown in FIGS. 2A, 2B, and 2C, it any number of millimeter-wave wave radar sensor circuits may be mounted depending on the particular application and its specifications. Moreover, millimeter-wave radar sensors 202 may be arranged according to the various different ways described hereinbelow.

FIG. 3A illustrates a block diagram of a millimeter-wave radar sensor system 300 that may be used to implement millimeter-wave radar sensor circuits in the various disclosed embodiments. Millimeter-wave radar sensor system 300 includes millimeter-wave radar sensor circuit 302 and processing circuitry 304. Embodiment millimeter-wave radar sensor circuits may be implemented, for example, using a two-dimensional millimeter-wave phase-array radar that measures the position and relative speed of target 114. The millimeter-wave phase-array radar transmits and receives signals in the 50 GHz to 80 GHz range. Alternatively, frequencies outside of this range may also be used. In some embodiments, millimeter-wave radar sensor circuit 302 operates as a frequency modulated continuous wave (FMCW) radar sensor having multiple transmit and receive channels. Alternatively, other types of radar systems may be used such as pulse radar, MCFW, and NLFM to implement millimeter-wave radar sensor circuit 302.

Millimeter-wave radar sensor circuit 302 transmits and receives radio signals for detecting target 114 in three-dimensional space. For example, millimeter-wave radar sensor circuit 302 transmits an incident RF signal and receives a RF signal that is a reflection of the incident RF signal from target 114. The received reflected RF signal is downconverted by millimeter-wave radar sensor circuit 302 to determine beat frequency signals. These beat frequency signals may be used to determine information such as the location, speed, angle, etc., of target 114 in three-dimensional space.

In various embodiments, millimeter-wave radar sensor circuit 302 is configured to transmit incident RF signals 301 toward target 114 via transmit antennas 312 and to receive reflected RF signals 303 from target 114 via receive antennas 314. Millimeter-wave radar sensor circuit 302 includes transmitter front-end circuits 308 coupled to transmit antennas 312 and receiver front-end circuit 310 coupled to receive antennas 314.

During operation, transmitter front-end circuits 308 may transmit RF signals toward target 114 one at a time or simultaneously. While two transmitter front-end circuits 308 are depicted in FIG. 3A, it should be appreciated that millimeter-wave radar sensor circuit 302 may include fewer or greater than two transmitter front-end circuits 308. Each transmitter front-end circuit 308 includes circuitry configured to produce the incident RF signals. Such circuitry may include, for example, RF oscillators, upconverting mixers, RF amplifiers, variable gain amplifiers, filters, transformers, power splitters, and other types of circuits.

Receiver front-end circuit 310 receives and processes the reflected RF signals from target 114. As shown in FIG. 3A, receiver front-end circuit 310 is configured to be coupled to four receive antennas 314, which may be configured as a 2×2 antenna array. In alternative embodiments, receiver front-end circuit 310 may be configured to be coupled to greater or fewer than four antennas, with the resulting antenna array being of various n×m dimensions depending on the specific embodiment and its specifications. Receiver front-end circuit 310 may include, for example, RF oscillators, upconverting mixers, RF amplifiers, variable gain amplifiers, filters, transformers, power combiners and other types of circuits.

Radar circuitry 306 provides signals to be transmitted to transmitter front-end circuits 308, receives signals from receiver front-end circuit 310, and may be configured to control the operation of millimeter-wave radar sensor circuit 302. In some embodiments, radar circuitry 306 includes, but is not limited to, frequency synthesis circuitry, upconversion and downconversion circuitry, variable gain amplifiers, analog-to-digital converters, digital-to-analog converters, digital signal processing circuitry for baseband signals, bias generation circuits, and voltage regulators.

Radar circuitry 306 may receive a baseband radar signal from processing circuitry 304 and control a frequency of an RF oscillator based on the received baseband signal. In some embodiments, this received baseband signal may represent a FMCW frequency chip to be transmitted. Radar circuitry 306 may adjust the frequency of the RF oscillator by applying a signal proportional to the received baseband signal to a frequency control input of a phase locked loop. Alternatively, the baseband signal received from processing circuitry 304 may be upconverted using one or more mixers. Radar circuitry 306 may transmit and digitize baseband signals via a digital bus (e.g., a USB bus), transmit and receive analog signals via an analog signal path, and/or transmit and/or receive a combination of analog and digital signals to and from processing circuitry 304.

Processing circuitry 304 acquires baseband signals provided by radar circuitry 306 and formats the acquired baseband signals for transmission representing beat frequency signals to an embodiment signal processing unit, such as SPU 164 shown in FIG. 1E. In some embodiments, processing circuitry 304 includes a bus interface (not shown) for transferring data to other components within the facial recognition system. Optionally, processing circuit 304 may also perform signal processing steps used by embodiments facial recognition systems such as a fast Fourier transform (FFT), a short-time Fourier transform (STFT), target classification, machine learning, and the like. In addition to processing the acquired baseband signals, processing circuitry 304 may also control aspects of millimeter-wave radar sensor circuit 302, such as controlling the transmissions produced by millimeter-wave radar sensor circuit 302.

The various components of millimeter-wave radar sensor system 300 may be partitioned in various ways. For example, millimeter-wave radar sensor circuit 302 may be implemented on one or more RF integrated circuits (RFICs), antennas 312 and 314 may be disposed on a circuit board, and processing circuitry 304 may be implemented using a processor, a microprocessor, a digital signal processor and/or a custom logic circuit disposed on one or more integrated circuits/semiconductor substrates. Processing circuitry 304 may include a processor that executes instructions in an executable program stored in a non-transitory computer readable storage medium, such as a memory to perform the functions of processing circuitry 304. In some embodiments, however, all or part of the functionality of processing circuitry 304 may be incorporated on the same integrated circuit/semiconductor substrate on which millimeter-wave radar sensor circuit 302 is disposed.

In some embodiments, some or all portions of millimeter-wave radar sensor circuit 302 may be implemented in a package that contains transmit antennas 312, receive antennas 314, transmitter front-end circuits 308, receiver front-end circuit 310, and/or radar circuitry 306. In some embodiments, millimeter-wave radar sensor circuit 302 may be implemented as one or more integrated circuits disposed on a circuit board, and transmit antennas 312 and receive antennas 314 may be implemented on the circuit board adjacent to the integrated circuits. In some embodiments, transmitter front-end circuits 308, receiver front-end circuit 310, and radar circuitry 306 are formed on a same radar front-end integrated circuit (IC) die. Transmit antennas 312 and receive antennas 314 may be part of the radar front-end IC die, or may be implemented as separate antennas disposed over or adjacent to the radar front-end IC die. The radar front-end IC die may further include conductive layers, such as redistribution layers (RDLs), used for routing and/or for the implementation of various passive or active devices of millimeter-wave radar sensor circuit 302. In an embodiment, transmit antennas 312 and receive antennas 314 may be implemented using the RDLs of the radar front-end IC die.

FIG. 3B illustrates a plan view of millimeter-wave radar sensor circuit 320 that may be used to implement millimeter-wave radar sensor circuit 302. As shown, millimeter-wave radar sensor circuit 320 is implemented as an RFIC 324 coupled to transmit antennas 312 and receive antennas 314 implemented as patch antennas disposed on or within substrate 322. In some embodiments, substrate 322 may be implemented using a circuit board on which millimeter-wave radar sensor circuit 302 is disposed and on which transmit antennas 312 and receive antennas 314 are implemented using conductive layers of the circuit board. Alternatively, substrate 322 represents a wafer substrate on which one or more RDLs are disposed and on which transmit antennas 312 and receive antennas 314 are implemented using conductive layers on the one or more RDLs.

It should be appreciated that the implementation of FIG. 3B is just one of many ways that embodiment millimeter-wave radar sensor circuits could be implemented. In alternative embodiments, millimeter-wave radar sensor circuits may include greater or fewer than two transmitter and greater or fewer than four receivers. For example, millimeter-wave radar sensor circuit 320 of FIG. 3B could be modified to incorporate a rectangular linear array (RLA) of receive antennas 314 having an array of any dimension, such as n receive antennas 314 arranged in a i×j array where ij=n. Specific examples include but are not limited to a total of six receive antennas arranged in a 3×2 array, a total of eight antennas arranged in an 4×2 array, or a total of sixteen antennas arranged in an 8×2 array. Each of these n receive antennas 314 can be coupled to a corresponding pin on RFIC 324 and coupled to a corresponding receive circuit within RFIC 324.

As a further example, FIG. 3C illustrates a plan view of millimeter-wave radar sensor circuit 332 that includes one transmit antenna 312 and two receive antennas 314 coupled to RFIC 334 disposed on substrate 336. Millimeter-wave radar sensor circuit 332 could be modified to incorporate a uniform linear array (ULA) of receive antennas 314 having a linear array of any length, such as n receive antennas 314 arranged in an n×1 or 1×n. Specific examples include but are not limited to a total of four receive antennas arranged in a 1×1 array or a total of eight antennas arranged in an 8×1 array. Each of these n receive antennas 314 can be coupled to a corresponding pin on RFIC 334 and coupled to a corresponding receive circuit within RFIC 334. In further alternative embodiments, transmit antennas 312 millimeter-wave radar sensor circuits 320 and 332 may be similarly arranged in a RLA or a ULA.

In some embodiments facial recognition applications, a tradeoff can be made regarding the number of sensors used and the number of transmit/receive antennas present on the sensor. For example, in many applications a choice could be made between using four or more sensors having one transmit antenna and two receive antennas such as shown in FIGS. 3A and 3B, and using two or more sensors having two transmit antennas and four receive antennas such as shown in FIG. 3C. One reason for the ability to use fewer radar sensor circuits having more antennas is due to increased directionality and resolution of the sensors having more antennas. In general, using more antennas per millimeter-wave radar sensor 202 assists in the extraction of location information using coherent signal processing and is computationally less intensive. On the other hand, a greater number millimeter-wave radar sensors 202 that include less antennas may implemented by using non coherent signal processing with additional computation and compensation.

Figure 4A:
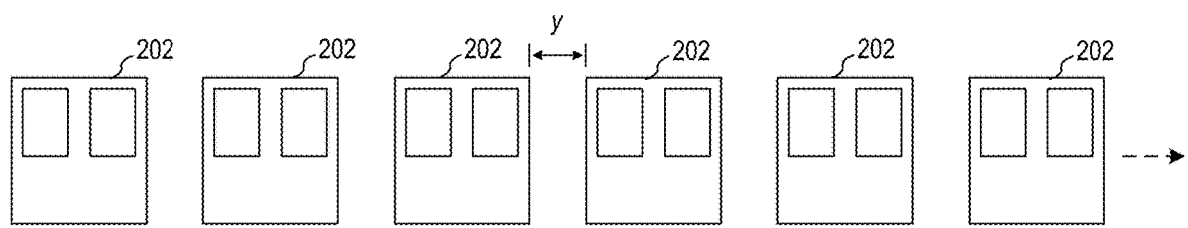
FIGS. 4A, 4B, 4C and 4D illustrate various configurations for the placement of millimeter-wave radar sensors.

FIGS. 4A-4D illustrate various configurations for the placement of millimeter-wave radar sensors 202. FIG. 4A illustrates millimeter-wave radar sensors 202 configured in a uniform linear array with a distance y between each sensor. While six millimeter-wave radar sensors 202 are shown in the illustration, it should be understood that greater or fewer than six millimeter-wave radar sensors 202 may be used depending on the specific embodiment and its specifications.

Figure 4B:
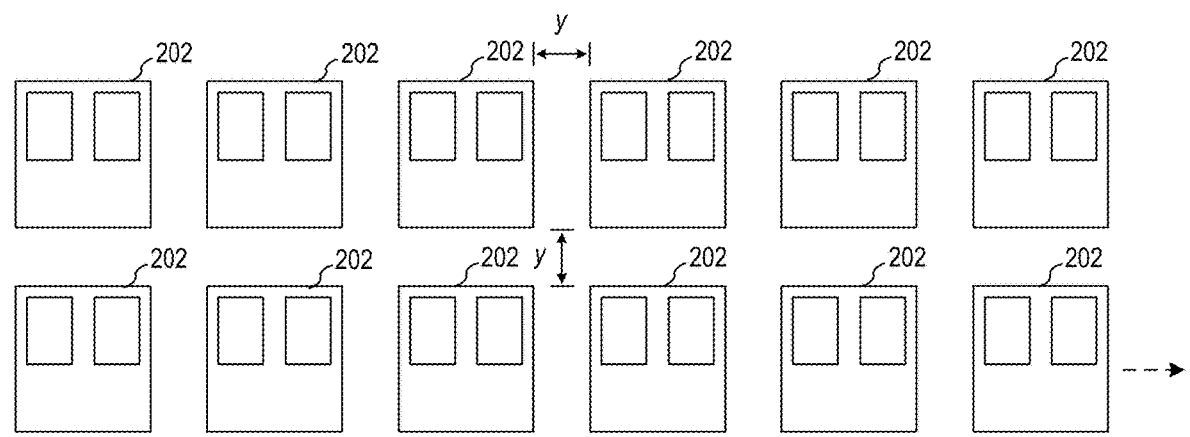

FIG. 4B illustrates millimeter-wave radar sensors 202 configured in a uniform rectangular array with a distance y between each sensor. While an array of 2×6 millimeter-wave radar sensors 202 are shown in the illustration, it should be understood that any rectangular array dimension may be used depending on the specific embodiment and its specifications. Configuring millimeter-wave radar sensors 202 in a rectangular configuration helps to improve cross-range resolution. In various embodiments, the range of the radar system is a distance between the sensor and the target, while the cross-range of the resolution pertains to a spatial resolution within a sensing place of radar sensors 202.

Figure 4C:
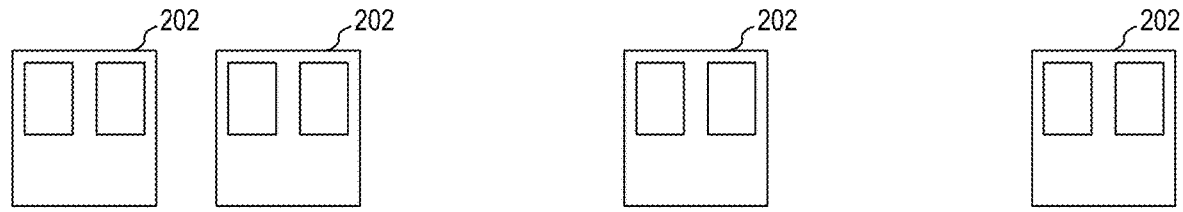
Figure 4D:
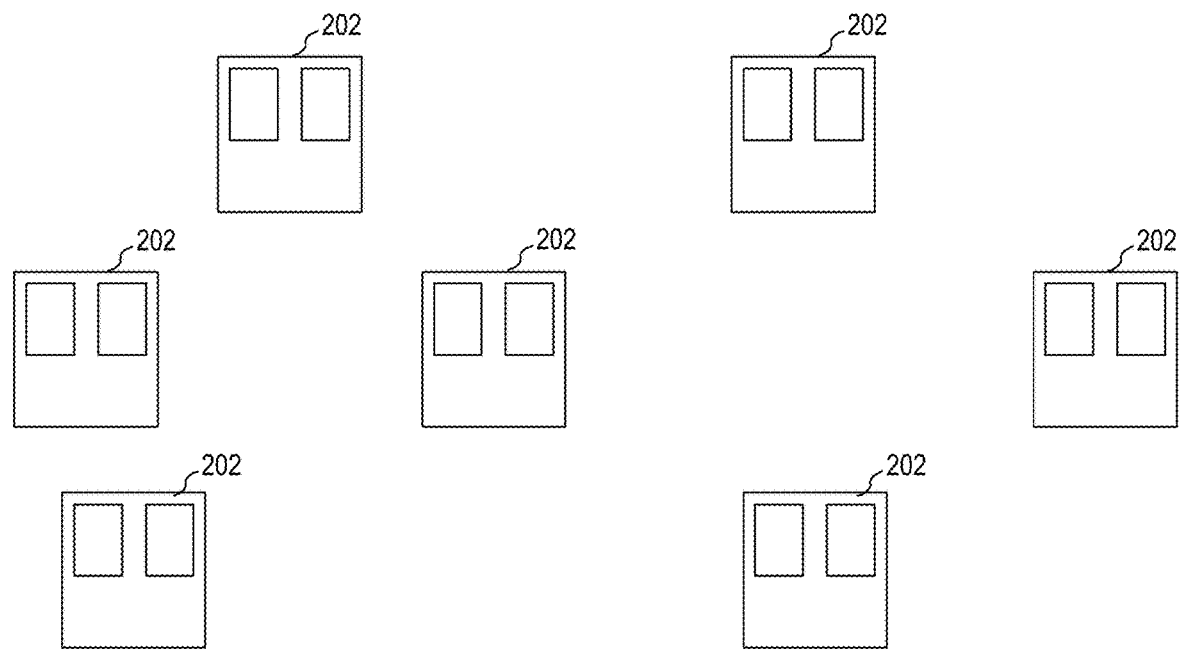

Millimeter-wave radar sensors 202 may also be implemented in a non-uniform configuration. For example, FIG. 4C illustrates millimeter-wave radar sensors 202 configured in a non-uniform linear array, and FIG. 4D illustrates millimeter-wave radar sensors 202 configured in a non-uniform two-dimensional array.

In various embodiments, millimeter-wave radar sensors 202 have a minimum distance of between $0.5\lambda$ and $0.7\lambda$ between each other where $\lambda$ is the wavelength of the millimeter-wave RF signal. This distance between millimeter-wave radar sensors 202 may be increased when the position of each sensor is known for processing extracted data.

In various embodiments, millimeter-wave radar sensors 202 may be mounted on a variety of surfaces and may be hidden under different materials and/or radome types that include, for example, polycarbonate, glass, plastics and other materials. In some embodiments, metals are not used above the sensor system. In other embodiments, metals may be used above the sensor plane as a shield or a waveguide depending on the particular system. For example, in a yagi antenna disposed on the substrate of millimeter-wave radar sensor 202 may be used to transmit or receive a signal in the same plane as the sensor. In such a case, the antenna may be rotated by 90 degrees such that bean produced by the radar sensor is directed toward the target. A metal shield may be disposed above the antenna.

In some embodiments, millimeter-wave radar sensors 202 operate at a frequency range of 57 GHz to 64 GHz for 7 GHz bandwidth. However, different frequency ranges and bandwidths could be used, as the resolution of the system generally is proportional to the bandwidth. In some cases, the power levels transmitted by millimeter-wave radar sensors 202 may be limited to comply with government regulations, such as regulations promulgated by the United States Federal Communications Commission (FCC). In some embodiments, any uniform linear array (ULA), non-uniform linear array (NULA), uniform rectangular array (URA) or non-uniform rectangular array (NURA) can be used depending on resolution requirements, power consumption, system space available etc.

Figure 5:
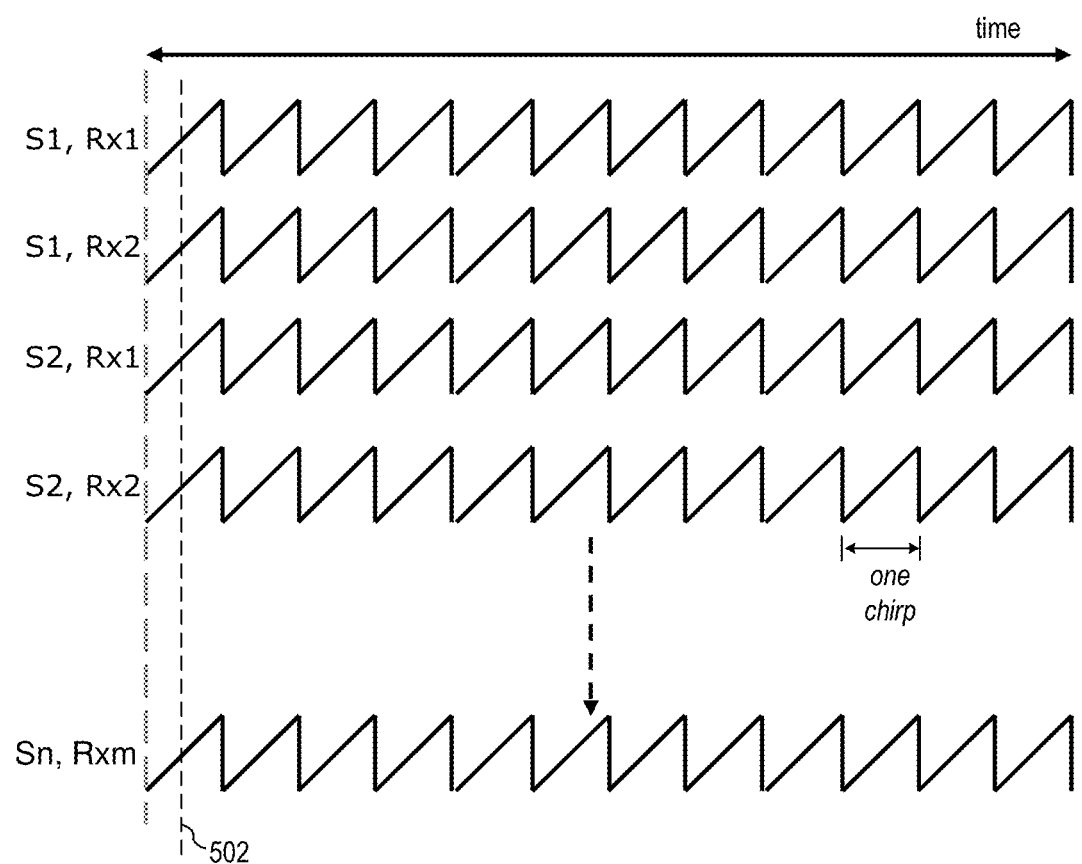
FIG. 5 illustrates a waveform diagram showing received radar signals over time.

FIG. 5 illustrates a waveform diagram showing the frequency of received RF signals for n millimeter-wave radar sensors that each have m receive antennas. For example, the waveform labeled as S1, Rx1 represents the received frequency of an RF signal received on the first antenna Rx1 of first sensor S1; S1, Rx2 represents the received frequency of an RF signal received on the second antenna Rx2 of first sensor S1; S2, Rx1 represents the received frequency of an RF signal received on the first antenna Rx1 of second sensor S2; S2, Rx2 represents the received frequency of an RF signal received on the second antenna Rx2 of second sensor S2; and Sn, Rxm represents the received frequency of an RF signal received on the mth antenna Rxm of the nth sensor Sn. In some embodiments, these waveforms are downconverted to baseband and the phase of the signals are determined/recorded as well as the frequency. Each sawtooth-shaped portion of each trace of the waveform diagram represents one reflected "chip" received by the respective radar sensor. For example, the minimum value of each sawtooth-shaped portion represents a minimum received frequency (e.g, 57 GHz) and the maximum value of each sawtooth-shaped portion represents a maximum received frequency (e.g, 64 GHz). In one specific example, each millimeter-wave radar sensor transmits 64 chirps during a time period of two seconds, and the system obtains 256 samples per chirp. These samples may be obtained and digitized within each millimeter-wave sensor and then sent to a processor, such as SPU 164 illustrated in FIG. 1E, for further processing. In various embodiments, the phase of the received signal is sampled and recorded as well as the frequency of the signal.

In some embodiments, a series of FFTs are calculated based on the received signals illustrated in FIG. 5. For example, an FFT may be taken of each waveform. In some embodiments, a windowed FFT having a length of the chirp (e.g, 256 samples) and may be calculated along each waveform for the entire 64-chirp duration or a portion of the 64-chip duration. These FFTs of each waveform may be referred to as a "range FFT." In addition, a spatial FFT may be calculated for one or more sample points according to the location of each millimeter-wave radar sensor and antenna. These FFTs may be referred to as "azimuth FFTs." In alternative embodiments, other transform types could be used besides an FFT, such as a Discrete Fourier Transform (DFT) or other transform types such as a z-transform.

Figure 6:
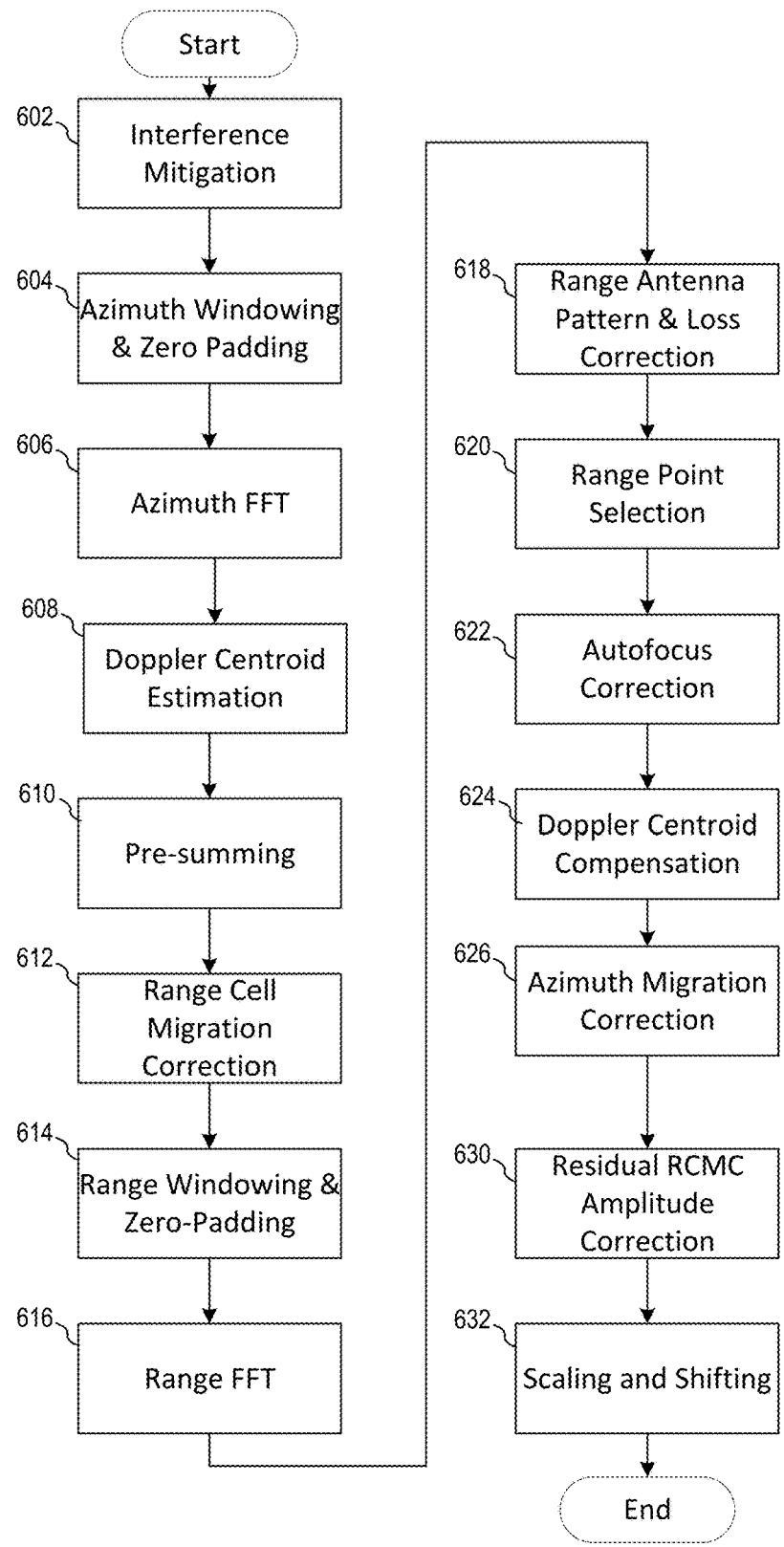
FIG. 6 illustrates a block diagram of an embodiment feature extraction algorithm.

FIG. 6 illustrates a method of extracting features according to an embodiment of the present invention. In various embodiments, the method takes sampled data produced by the millimeter-wave radar sensors (phase and frequency) and produces extracted features in the form of range and azimuth FFTs. In some embodiments, additional features may be derived. These extracted features may be stored for future comparison, or may be compared to stored parameters to in order to identify and authenticate a user using machine learning algorithms.

In step 602, interference mitigation is performed. This includes pre-whitening the received radar sensor data for mitigating antenna correlation and colored clutter response. In step 604, the received sensor data is prepared for the performance of an azimuth FFT by windowing and zero padding data arrays (representing training data) on which the azimuth FFT will be performed. In some embodiments windowing reduces side-lobes of the transform along the azimuth/cross-range axis. In step 606, the azimuth FFTs are performed, which are a series of two-dimensional FFTs representing the received sensor data across the space of the sensors at a particular selected time point, such as time point 502. In some embodiments, a set of azimuth FFTs are collected over a single chirp to form a spectrogram. The FFTs of each time point of the chirp are averaged over two or more chirps within a multiple chirp period.

In step 608, a Doppler centroid estimation is performed on the range azimuth data from step 606 in which the Doppler effect due to human movement along a slow time from all sensors is estimated for compensation in a later step (step 624) described below. A pre-summing step is performed on the received radar sensor data to determine the average value across chirps to improve signal quality (step 610). Pre-summing in 610 is performed to remove the clutter response and improve the SNR of the system. Pre-summing may be performed on range-azimuth data map for smoothening. In step 612, range mismatch between radar sensors and range walk that might have arisen from the radar sensor's azimuth axis is corrected by alignment of the chirps. In step 614 range windowing, zero padding is performed in preparation of the range FFT for the sensor data received from each sensor. In this step a window function is applied to the received radar data followed by zero-padding to improve accuracy along range axis. In step 616, a range FFT is performed on the data received by each sensor and/or each antenna of each sensor on the windowed and zero-padded range data.

In step 618, the range FFTs produced in step 616 are adjusted to correct for antenna pattern and path loss. In some embodiments, antenna pattern are corrected according to an $R^4$ path loss. Potential range points which include, for example, key facial features such as eyes, noise, ears, cheeks are selected in step 620, and autofocus correction is applied to the range FFT data in step 622 using a polynomial fitted phase gradient algorithm. In step 624, a Doppler centroid compensation is applied to the auto-focused range-azimuth data based on the Doppler centroid estimation performed in step 608. In this step, human movements are corrected to improve the range-cross range image.

In step 626, azimuth migration correction is performed. Azimuth migration can manifest itself in the form of smearing of the FFT spectrum along both the range and azimuth directions. In various embodiments, azimuth migration is corrected through compression. The data across the azimuth FFT may be compressed using matched filter techniques. Residual range cell migration correction (RCMC) is performed on a range-azimuth compressed data map_in step 630. While the earlier RCMC corrected for explicit range walk in step 612, the residual RCMC performed in step 630 corrected for phase change induced by different ranges seen by different sensors. Finally, in step 632, scaling and shifting operations are performed on a final range-azimuth map to ensure all images have the same scale.

Figure 7:
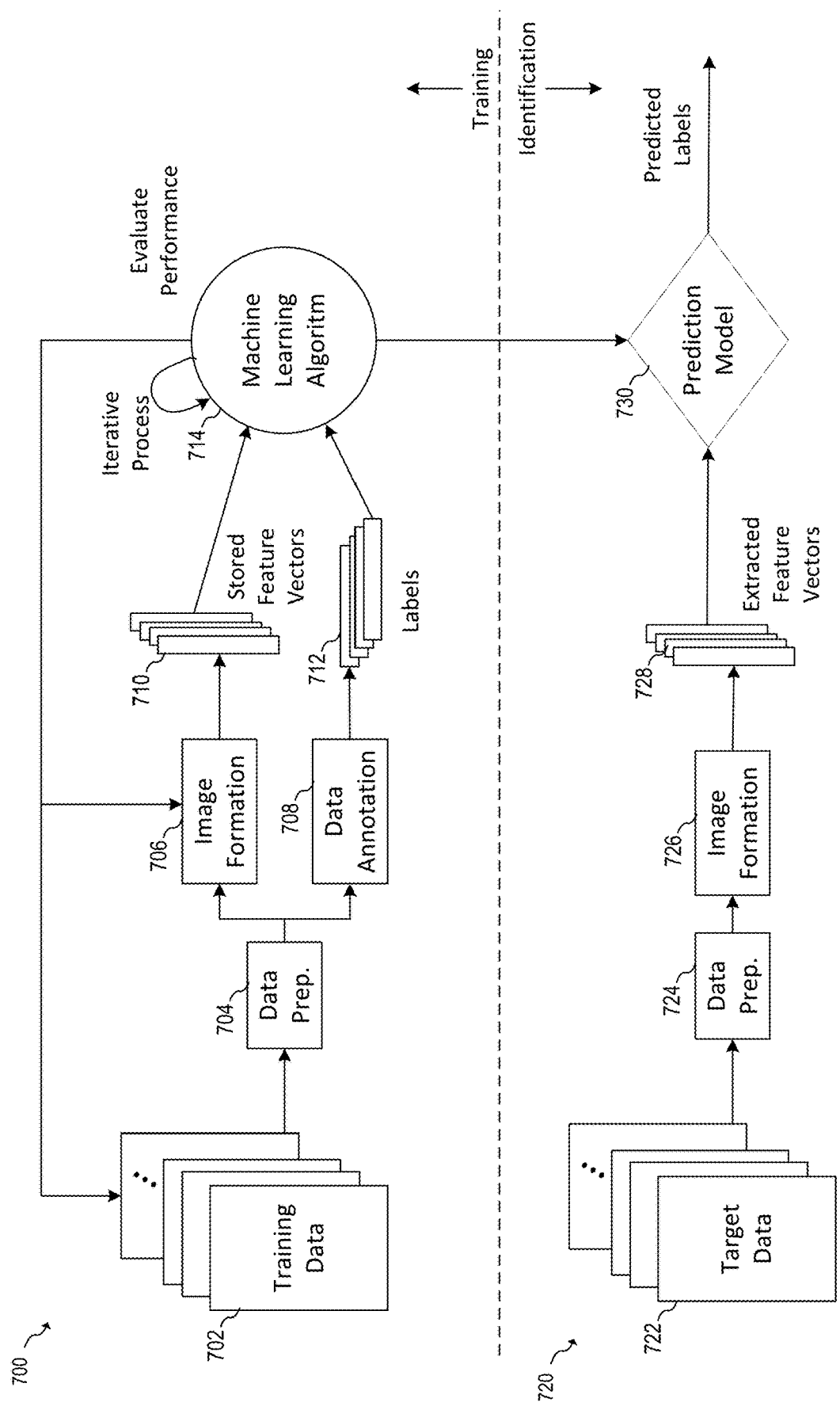
FIG. 7 illustrates a block diagram showing a machine learning pipeline for feature extraction and identification.

FIG. 7 illustrates a block diagram showing a machine learning pipeline for feature extraction and identification. The top portion 700 of FIG. 7 is devoted to the processing storage of features for comparison to later measurements. The data and steps shown in this portion represent the actions performed when radar measurements are performed and processed for a new user. The bottom portion 720 is devoted to the processing and comparison of new measurements for comparison to stored data. These data and steps represent the actions performed when the system is identifying and validating a user during normal operations.

As shown in the top portion 700 of FIG. 7, training data 702 is transformed into stored feature vectors 710 and corresponding labels 712. Training data 207 represents the raw data produced by one or more sets of radar sensor measurements, feature vectors 710 represent sets of generated vectors that are representative of the training data, 702 and labels 712 represent user metadata associated with the corresponding training data 702 and feature vectors 710. As shown, training data 702 is transformed into feature vectors 710 using image formation algorithms 706 from the compressed azimuth-range map. This image formation algorithm may correspond to the method for extracting features shown and described with respect to FIG. 6 above. Data preparation block 704 represents the initial formatting of raw sensor data, and data annotation block 708 represents the derivation of user identification, such as name and official credentials from training data 702. In some embodiments labels 712 include classes and segregation of user metadata.

During operation, one or more radar images are taken of a user using millimeter-wave sensors described above. In some cases, multiple radar images are recorded to increase the accuracy of identification. Machine learning algorithm 714 evaluates the ability of a prediction model 730 to identify feature vectors and iteratively updates image formation algorithm 706 and training data to 702 increase the classification accuracy of the algorithm. The training performance of the machine learning algorithm may be determined by calculating the cross-entropy performance. In some embodiments, the machine learning algorithm 714 iteratively adjusts image formation parameters for a classification accuracy of at least 90%. Alternatively, other classification accuracies could be used.

Machine learning algorithm 714 may be implemented using a variety of machine learning algorithms known in the art. For example, a random forest algorithm or neural network algorithm may be used for classification and analysis of stored feature vectors 710. During the iterative optimization of stored feature vectors 710, a number of parameters of image formation 706 may be updated. Examples of image formation parameters that may be updated using the machine learning process include but are not limited to: the number of chirps being averaged during the calculation of the range FFT and/or the azimuth FFTs; the windowing and zero padding of the range FFT and/or the azimuth FFTs; the number of range points selected and polynomial order for autofocus algorithms.

Once the system has been trained using reference training data 702 that represents reference radar measurements made on a plurality of reference sites (e.g., various pails of the human face), new target data 722 is received by embodiment millimeter-wave radar sensors during the course of identifying users and targets. Data preparation block 724 prepares the new target data 722 for image formation, and image formation block 726 forms new extracted feature vectors 728 using, for example, the method described above with respect to FIG. 6. Prediction model 730 utilizes machine learning algorithm 714 to match new extracted feature vectors 728 to a stored feature vector 710. When a match is identified a predicted label is provided that identifies the new feature vector. In some embodiments, data from the stored labels 712 is provided as a predicted label. Prediction model 730 is may be a machine learning model with optimal parameters computed/evaluated through a machine learning algorithm.

Figure 8:
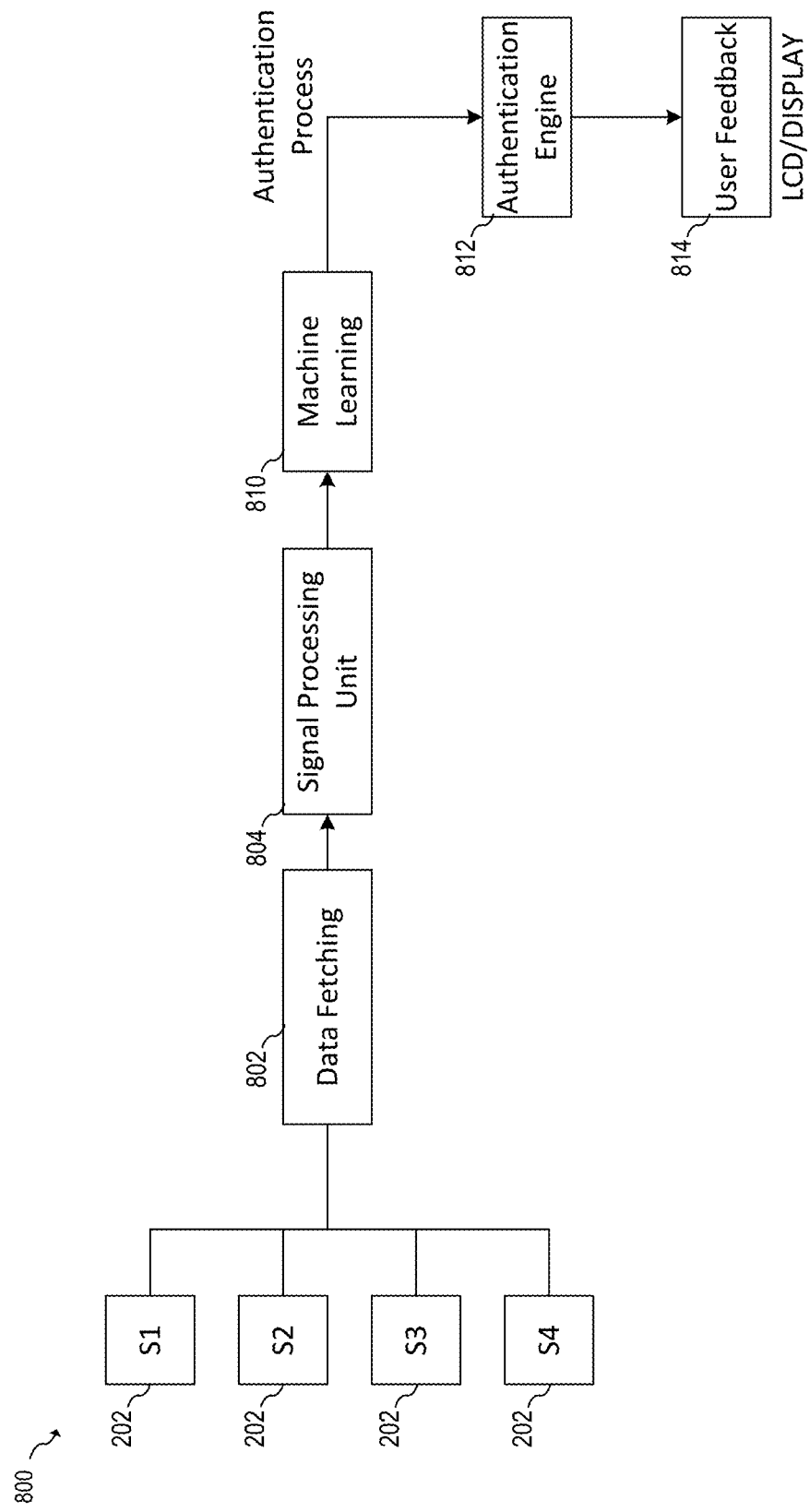
FIG. 8 illustrates a block diagram of an embodiment facial recognition system.

FIG. 8 shows a block diagram of an embodiment facial recognition system 800 that illustrates possible partitioning of system functions in the various embodiments disclosed herein. As shown, facial recognition system 800 includes millimeter-wave radar sensors 202. While only four millimeter-wave radar sensors 202 are shown for ease of illustration, it should be understood that any number of millimeter-wave sensor could be used. In various embodiments, millimeter-wave radar sensors 202 could be arranged, for example, as shown in FIGS. 4A-4D above.

Data fetching function 802 is responsible for transferring the data produced by millimeter-wave radar sensors 202 and formatting the data for further processing by signal processing unit 804. For example, data fetching function 802 may monitor one or more data busses coupled to millimeter-wave radar sensors 202, receive the data from the one or more data busses, format the received data, and store the formatted data in memory for further processing by signal processing unit 804. The functionality of data fetching function 802 may be implemented using an application processor, a CPU, an FPGA or other circuit capable of performing data fetching functions.

In some embodiments, signal processing unit 804 performs the training steps shown in top portion 700 of FIG. 7 except for machine learning algorithm 714 (e.g., steps 702, 704, 706, 708, 710 and 712), which includes the steps of data preparation to the production of a final compressed azimuth-range image map. More specifically, signal processing unit 804 performs the steps of data preparation 704 and 724, image formation 706 and 726 to form stored feature vectors 710 and extracted feature vectors 728, and data annotation 708 to form labels 712. Signal processing unit 804 may perform additional functionality such as fusing together multiple sensor data. In various embodiments, the functionality of signal processing unit 804 may be implemented as software running on a processor. Alternatively, all or portions of the functionality of signal processing unit 804 may be implemented in hardware using, for example, dedicated digital signal processing hardware (DSP) implemented in custom logic, standard cell logic, or programmable logic such as an FPGA. In some embodiments, all or portions of the functionality of signal processing unit 804 may be implemented remotely using a computer server or cloud-based computing.

Machine learning block 810 implements the machine learning aspect of embodiments of the present invention, such as machine learning algorithm 714 and/or prediction model 730 described above with respect to FIG. 7. The functionality of signal processing unit 804 may be implemented as software running on a processor or implemented in hardware using, for example, dedicated digital signal processing hardware (DSP) implemented in custom logic, standard cell logic, or programmable logic such as an FPGA. In some embodiments, machine learning block 810 may be implemented remotely using a computer server or cloud-based computing.

Authentication engine 812 performs the steps of prediction model 730 shown in FIG. 7 and acknowledges the extracted feature vectors. User feedback 814 may include graphic user feedback via an electronic display such as an LED or LCD display. In some embodiments, user feedback 814 may also include performing an action in response to the authentication process. For example, if a user is successfully identified and authenticated, actions include but are not limited to unlocking a door such as a car door or a door to a building, granting access to a computer system, allowing access to a software application such as a banking application, or executing a computer program. In some embodiments, user feedback 814 may also include actions when the authentication process fails, such as sounding an alarm or alerting authorized personnel of a possible security breach.

In some embodiments, target 114 can be identified and authenticated by combining measurements from embodiment millimeter-wave radar sensors with other biometric and optical sensors including, but not limited to, fingerprint scanners, optical facial recognition systems, body scanners, camera sensors, and retinal scanners. Data derived from these scanners may be included within the target data sets 702 and 722 and/or within feature vectors 710 and 728, and machine learning algorithm 714 may be applied to the combined data sets and vectors that include data derived from the millimeter-wave radar sensor and from other sensors.

Figure 9:
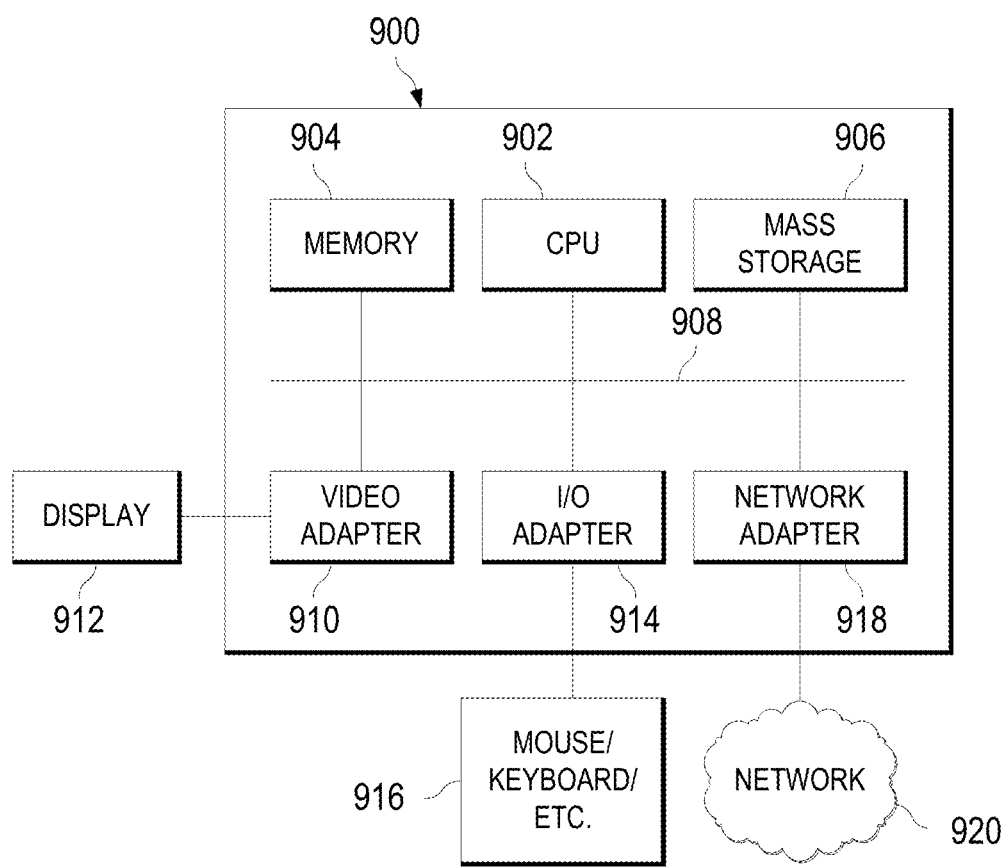
FIG. 9 a block diagram of a processing system that may be used to implement portions of embodiment facial recognition systems.

Referring now to FIG. 9, a block diagram of a processing system 900 is provided in accordance with an embodiment of the present invention. The processing system 900 depicts a general-purpose platform and the general components and functionality that may be used to implement portions of the embodiment radar system and/or an external computer or processing device interfaced to the embodiment radar system. The processing system 900 may include, for example, a central processing unit (CPU) 902, memory 904, and a mass storage device 906 connected to a bus 908 configured to perform the processes discussed above. The processing system 900 may further include, if desired or needed, a video adapter 910 to provide connectivity to a local display 912 and an input-output (I/O) Adapter 914 to provide an input/output interface for one or more input/output devices 916, such as a mouse, a keyboard, printer, tape drive, CD drive, or the like.

The processing system 900 also includes a network interface 918, which may be implemented using a network adaptor configured to be coupled to a wired link, such as an Ethernet cable, USB interface, or the like, and/or a wireless/cellular link for communications with a network 920. The network interface 918 may also comprise a suitable receiver and transmitter for wireless communications. It should be noted that the processing system 900 may include other components. For example, the processing system 900 may include power supplies, cables, a motherboard, removable storage media, cases, and the like. These other components, although not shown, are considered part of the processing system 900.

Example embodiments of the present invention are summarized here. Other embodiments can also be understood from the entirety of the specification and the claims filed herein.

EXAMPLE 1

A method of recognizing a biological target, the method comprising: performing radar measurements for a plurality of sites on the biological target using a millimeter-wave radar sensor: producing a target data set for the plurality of sites based on the radar measurements; extracting features from the target data set; comparing the extracted features to stored features; and determining whether the extracted features match the stored features based on the comparing.

EXAMPLE 2

The method of example 1, wherein performing the radar measurements includes forming a plurality of radar beams, wherein each of the plurality of radar beams are directed toward a corresponding site of the plurality of sites on the biological target.

EXAMPLE 3

The method of one of examples 1 and 2, wherein: the biological target includes a human face; and performing the radar measurements comprising performing the radar measurements on a plurality of sites on the human face.

EXAMPLE 4

The method of example 3, further comprising aligning the human face with the millimeter-wave radar sensor.

EXAMPLE 5

The method of example 4, wherein aligning includes: determining when the human face within a first distance of the millimeter-wave radar sensor; and performing the radar measurements when the human face is within the first distance based on the determining.

EXAMPLE 6

The method of example 5, wherein the first distance is between 10 centimeters and 30 centimeters.

EXAMPLE 7

The method of one of examples 5 and 6, wherein the aligning further includes: capturing an image of the human face using a camera; and positioning the human face within a first region based on the captured image.

EXAMPLE 8

The method of one of examples 5-7, wherein aligning further includes aligning the human face between a plurality of light emitters.

EXAMPLE 9

The method of one of examples 8-9, wherein the millimeter-wave radar sensor includes a plurality of millimeter-wave radar sensor circuits.

EXAMPLE 10

The method of example 9, wherein each of the plurality of millimeter-wave radar sensor circuits are associated with a corresponding site on the biological target.

EXAMPLE 11

The method of one of examples 9 and 10, wherein the plurality of millimeter-wave radar sensor circuits are arranged in a linear array.

EXAMPLE 12

The method of example 11, wherein the linear array is a uniform linear array.

EXAMPLE 13

The method of example 9, wherein the plurality of millimeter-wave radar sensor circuits are arranged in a rectangular array.

EXAMPLE 14

The method of example 13, wherein the rectangular array is a uniform rectangular array.

EXAMPLE 15

The method of one of examples 1-14, wherein comparing the extracted features to stored features includes using a random forest algorithm.

EXAMPLE 16

The method of one of examples 1-14, wherein comparing the extracted features to stored features includes using a neural network algorithm.

EXAMPLE 17

The method of one of examples 1-16, further comprising producing a set of stored features comprising: performing a set of reference radar measurements for a plurality of reference sites on the biological target using the millimeter-wave radar sensor: producing a training data set for the plurality of reference sites based on the reference radar measurements; and forming the stored features based on the training data set.

EXAMPLE 18

The method of example 17, wherein forming the stored features includes iteratively adjusting the forming of the stored features using a machine learning algorithm.

EXAMPLE 19

The method of example 18, wherein: forming the stored features includes performing a FFT on the training data set; and iteratively adjusting the forming of the stored features includes adjusting parameters of the FFT based using the machine learning algorithm.

EXAMPLE 20

The method of example 19, wherein adjusting the parameters of the FFT includes adjusting windowing of the FFT and adjusting zero padding of the training data set prior to performing the FFT.

EXAMPLE 21

The method of example 19, wherein performing the FFT includes: performing a range FFT for each target data set corresponding to each of the plurality of reference sites; and performing a two-dimensional FFT over the plurality of reference sites for a selected time point.

EXAMPLE 22

The method of example 21, wherein: the millimeter-wave radar sensor includes a plurality of millimeter-wave radar sensors, each of the plurality of millimeter-wave radar sensors associated with a corresponding one of the plurality of sites; and the method further includes adjusting the range FFT and the two-dimensional FFT to compensate for range and azimuth migration of the plurality of millimeter-wave radar sensors.

EXAMPLE 23

The method of one of examples 1-22, further comprising performing a first action when the extracted features match the stored features based on the determining.

EXAMPLE 24

The method of example 23, wherein the first action includes unlocking a lock.

EXAMPLE 25

A system comprising: a processing system configured to be coupled to a millimeter-wave radar sensor, the processing system configured to receive radar measurements for a plurality of sites of a biological target from the millimeter-wave radar sensor, produce a target data set for the plurality of sites based on the radar measurements performed by the millimeter-wave radar sensor, extract features from the target data set, compare the extracted features to stored features, and determine whether the extracted features match the stored features based on the comparing.

EXAMPLE 26

The system of example 25, further comprising the millimeter-wave radar sensor.

EXAMPLE 27

The system of example 26, wherein the millimeter-wave radar sensor includes a plurality of millimeter-wave radar sensor circuits.

EXAMPLE 28

The system of example 27, wherein the each of the plurality of millimeter-wave radar sensor circuits includes two receive antenna and one transmit antenna.

EXAMPLE 29

The system of example 27, wherein each of the plurality of millimeter-wave radar sensor circuits includes four receive antennas and two transmit antennas.

EXAMPLE 30

The system of one of examples 27-29, wherein each of the plurality of millimeter-wave radar sensor circuits are associated with a corresponding site on the biological target.

EXAMPLE 31

The system of one of examples 27-30, wherein the plurality of millimeter-wave radar sensor circuits are arranged in a linear array.

EXAMPLE 32

The system of example 31, wherein the linear array is a uniform linear array.

EXAMPLE 33

The system of one of examples 27-30, wherein the plurality of millimeter-wave radar sensor circuits are arranged in a rectangular array.

EXAMPLE 34

The system of example 33, wherein the rectangular array is a uniform rectangular array.

EXAMPLE 35

The system of one of examples 25-34, wherein the biological target includes a human face.

EXAMPLE 36

The system of one of examples 25-35, wherein the processing system is configured to compare the extracted features to stored features includes using a random forest algorithm.

EXAMPLE 37

The system of one of examples 25-25, wherein the processing system is configured to compare the extracted features to stored features includes using a neural network algorithm.

EXAMPLE 38

The system of one of examples 25-37, wherein the processing system is further configured to produce a set of stored features by receiving a set of reference radar measurements for a plurality of reference sites on the biological target from the millimeter-wave radar sensor: producing a training data set for the plurality of reference sites based on the reference radar measurements; and forming the stored features based on the training data set.

EXAMPLE 39

The system of example 38, wherein forming the stored features includes iteratively adjusting the forming of the stored features using a machine learning algorithm.

EXAMPLE 40

The system of example 39, wherein: forming the stored features includes performing a FFT on the training data set; and iteratively adjusting the forming of the stored features includes adjusting parameters of the FFT based using the machine learning algorithm.

EXAMPLE 41

The system of example 40, wherein adjusting the parameters of the FFT includes adjusting windowing of the FFT and adjusting zero padding of the training data set prior to performing the FFT.

EXAMPLE 42

The system of one of examples 40 and 41, wherein performing the FFT includes: performing a range FFT for each target data set corresponding to each of the plurality of reference sites; and performing a two-dimensional FFT over the plurality of reference sites for a selected time point.

EXAMPLE 43

The system of example 42, wherein: the millimeter-wave radar sensor includes a plurality of millimeter-wave radar sensors, each of the plurality of millimeter-wave radar sensors associated with a corresponding one of the plurality of sites; and the processing system is further configured to adjust the range FFT and the two-dimensional FFT to compensate for range and azimuth migration of the plurality of millimeter-wave radar sensors.

EXAMPLE 44

A non-transitory computer readable storage medium with an executable program stored thereon, the executable program including instructions to: receive radar measurements for a plurality of sites of a biological target from a millimeter-wave radar sensor, produce a target data set for the plurality of sites based on the radar measurements performed by the millimeter-wave radar sensor, extract features from the target data set, compare the extracted features to stored features, and determine whether the extracted features match the stored features based on the comparing.

EXAMPLE 45

The non-transitory computer readable storage medium of example 44, wherein the executable program is further configured to produce a set of stored features by:
receiving a set of reference radar measurements for a plurality of reference sites on the biological target from the millimeter-wave radar sensor: producing a training data set for the plurality of reference sites based on the reference radar measurements; and forming the stored features based on the training data set.

EXAMPLE 46

The non-transitory computer readable storage medium of example 45, wherein forming the stored features includes iteratively adjusting the forming of the stored features using a machine learning algorithm.

EXAMPLE 47

The non-transitory computer readable storage medium of example 46, wherein: forming the stored features includes performing a FFT on the training data set; and iteratively adjusting the forming of the stored features includes adjusting parameters of the FFT based using the machine learning algorithm.

EXAMPLE 48

The non-transitory computer readable storage medium of example 47, wherein adjusting the parameters of the FFT includes adjusting windowing of the FFT and adjusting zero padding of the training data set prior to performing the FFT.

EXAMPLE 49

The non-transitory computer readable storage medium of example 47, wherein performing the FFT includes: performing a range FFT for each target data set corresponding to each of the plurality of reference sites; and performing a two-dimensional FFT over the plurality of reference sites for a selected time point.

EXAMPLE 50

The non-transitory computer readable storage medium of example 49, wherein: the millimeter-wave radar sensor includes a plurality of millimeter-wave radar sensors, each of the plurality of millimeter-wave radar sensors associated with a corresponding one of the plurality of sites; and the system further includes adjusting the range FFT and the two-dimensional FFT to compensate for range and azimuth migration of the plurality of millimeter-wave radar sensors.

Advantages of embodiments of the present invention include the ability to accurately identify and authenticate a human face or other biological target. By using a plurality of millimeter-wave radar sensors directed at different potions of the target, the physical dimensions and RF reflectivity properties of the target can be evaluated. These types of measurements advantageously make it difficult to spoof the security system by presenting photographs or artificial models of the target to the sensors. A further advantage includes the ability to implement an accurate facial recognition system in a small form factor suitable inclusion on portable electronic devices such as a smartphone. In low power applications in which the facial recognition system has either a wired or wireless network interface, computationally intensive processing tasks can be advantageously offloaded or partitioned to an external computing device or to a cloud-based processing system.

Another advantage of embodiments include the ability to calibrate out the effect of electronic and physical mismatch errors of the radar sensors and during the execution of the machine learning algorithm. This ability to calibrate errors during operation advantageously allows for the physical implementation of sensor and sensor arrays using inexpensive components without the need for extensive factory testing and calibration.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of recognizing a biological target, the method comprising:
    performing radar measurements for a plurality of sites on the biological target using a millimeter-wave radar sensor;
    producing a target data set for the plurality of sites based on the radar measurements;
    extracting features from the target data set;
    producing a set of stored features comprising:
        performing a set of reference radar measurements for a plurality of reference sites on the biological target using the millimeter-wave radar sensor,
        producing a training data set for the plurality of reference sites based on the reference radar measurements, and
        forming the stored features based on the training data set;
    comparing the extracted features to the stored features; and determining whether the extracted features match the stored features based on the comparing.

2. The method of claim 1, wherein performing the radar measurements comprises forming a plurality of radar beams, wherein each of the plurality of radar beams are directed toward a corresponding site of the plurality of sites on the biological target.

3. The method of claim 1, wherein:
the biological target comprises a human face; and
performing the radar measurements comprising performing the radar measurements on a plurality of sites on the human face.

4. The method of claim 3, further comprising aligning the human face with the millimeter-wave radar sensor.

5. The method of claim 4, wherein aligning comprises:
determining when the human face within a first distance of the millimeter-wave radar sensor; and
performing the radar measurements when the human face is within the first distance based on the determining.

6. The method of claim 5, wherein the first distance is between 10 centimeters and 30 centimeters.

7. The method of claim 5, wherein the aligning further comprises:
capturing an image of the human face using a camera; and
positioning the human face within a first region based on the captured image.

8. The method of claim 1, wherein
the millimeter-wave radar sensor comprises a plurality of millimeter-wave radar sensor circuits; and
each of the plurality of millimeter-wave radar sensor circuits are associated with a corresponding site on the biological target.

9. The method of claim 1, wherein comparing the extracted features to stored features comprises using at least one of a random forest algorithm or a neural network algorithm.

10. The method of claim 1, wherein forming the stored features comprises iteratively adjusting the forming of the stored features using a machine learning algorithm.

11. The method of claim 10, wherein:
forming the stored features comprises performing a FFT on the training data set; and
iteratively adjusting the forming of the stored features comprises adjusting parameters of the FFT based using the machine learning algorithm.

12. The method of claim 11, wherein adjusting the parameters of the FFT comprises adjusting windowing of the FFT and adjusting zero padding of the training data set prior to performing the FFT.

13. The method of claim 11, wherein performing the FFT comprises:
performing a range FFT for each target data set corresponding to each of the plurality of reference sites; and
performing a two-dimensional FFT over the plurality of reference sites for a selected time point.

14. The method of claim 13, wherein:
the millimeter-wave radar sensor comprises a plurality of millimeter-wave radar sensors, each of the plurality of millimeter-wave radar sensors associated with a corresponding one of the plurality of sites; and
the method further comprises adjusting the range FFT and the two-dimensional FFT to compensate for range and azimuth migration of the plurality of millimeter-wave radar sensors.

15. The method of claim 1, further comprising performing a first action when the extracted features match the stored features based on the determining.

16. A system comprising:
a processing system configured to be coupled to a millimeter-wave radar sensor, the processing system configured to
receive radar measurements for a plurality of sites of a biological target from the millimeter-wave radar sensor;
produce a target data set for the plurality of sites based on the radar measurements performed by the millimeter-wave radar sensor;
extract features from the target data set;
produce a set of stored features by:
receiving a set of reference radar measurements for a plurality of reference sites on the biological target from the millimeter-wave radar sensor,
producing a training data set for the plurality of reference sites based on the reference radar measurements, and
forming the stored features based on the training data set, wherein forming the stored features comprises iteratively adjusting the forming of the stored features using a machine learning algorithm;
compare the extracted features to stored features; and
determine whether the extracted features match the stored features based on the comparing.

17. The system of claim 16, further comprising the millimeter-wave radar sensor, wherein the millimeter-wave radar sensor comprises a plurality of millimeter-wave radar sensor circuits.

18. The system of claim 17, wherein the each of the plurality of millimeter-wave radar sensor circuits comprises two receive antenna and one transmit antenna.

19. The system of claim 17, wherein each of the plurality of millimeter-wave radar sensor circuits comprises four receive antennas and two transmit antennas.

20. The system of claim 17, wherein the plurality of millimeter-wave radar sensor circuits are arranged in at least one of a linear array or a rectangular array.

21. The system of claim 20, wherein the linear array is a uniform linear array and the rectangular array is a uniform rectangular array.

22. A non-transitory computer readable storage medium with an executable program stored thereon, the executable program including instructions to:
receive radar measurements for a plurality of sites of a biological target from a millimeter-wave radar sensor;
produce a target data set for the plurality of sites based on the radar measurements performed by the millimeter-wave radar sensor;
extract features from the target data set;
produce a set of stored features by:
receiving a set of reference radar measurements for a plurality of reference sites on the biological target from the millimeter-wave radar sensor,
producing a training data set for the plurality of reference sites based on the reference radar measurements, and
forming the stored features based on the training data set, wherein forming the stored features comprises iteratively adjusting the forming of the stored features using a machine learning algorithm;
compare the extracted features to stored features; and
determine whether the extracted features match the stored features based on the comparing.

* * * * *